Figure 1:
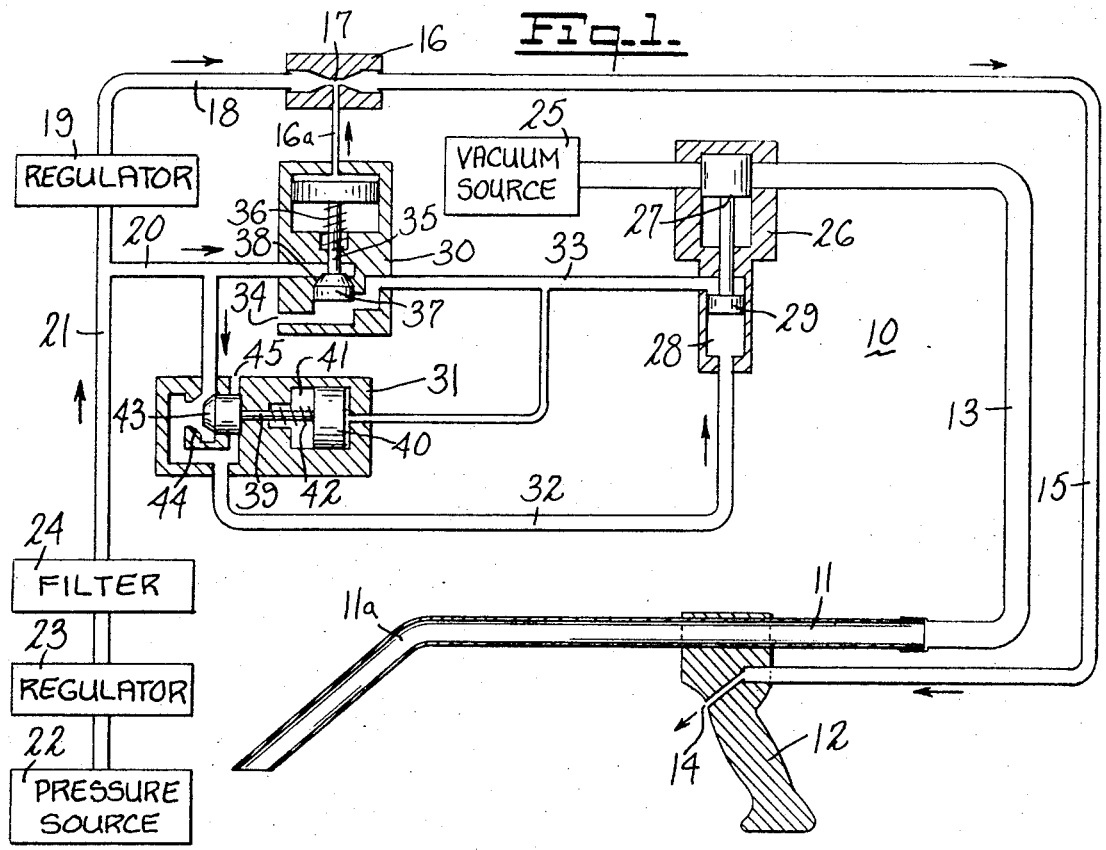

United States Patent [19]

Chamberlain

[11] 3,744,750
[45] July 10, 1973

[54] FLUIDIC CONTROL FOR FLUID SYSTEMS
[75] Inventor: Harold F. Chamberlain, New Haven, Conn.
[73] Assignee: Jarvis Corporation, Middleton, Conn.
[22] Filed: Jan. 10, 1972
[21] Appl. No.: 216,564

[52] U.S. Cl............... 251/28, 17/11, 15/314, 91/420, 91/465
[51] Int. Cl............................................ F16k 31/12
[58] Field of Search ............... 17/11; 91/420, 465, 91/466; 15/344, 314, 419; 251/28

[56] References Cited
UNITED STATES PATENTS
3,203,663  8/1965  Basham et al. ............... 17/11 X Primary Examiner—Henry T. Klinksiek
Attorney—Anthony P. Delio et al.

[57] ABSTRACT

A fluidically controlled fluid system in which a fluid source is operated in a first line when static pressure is established in a second line.

6 Claims, 2 Drawing Figures

PATENTED JUL 10 1973 3,744,750

3,744,750

FLUIDIC CONTROL FOR FLUID SYSTEMS

This invention relates to apparatus for controlling fluid systems, and more particularly relates to such apparatus which is fluidically actuated.

Many industries, including the poultry processing industry, use vacuum devices for handling and/or removal of parts. In the poultry processing industry, poultry is quite often processed by the removal of the vent, intestines and other internal organs through the use of a vacuum utilization apparatus. The use of a vacuum has been found to be commercially more suitable inasmuch as there is no undue removal of salable meat or organs, and the operation is fast and relatively clean with respect to hand processing. Additionally, various processing tools may be operated from a central vacuum source. However, the processors using such apparatus often tape or tie down an actuating trigger or button for their convenience. This can place a heavy load on a central vacuum source and cause depletion thereof when other processing tools are placed on line.

Accordingly, the present invention provides a new and improved vacuum utilization apparatus which is adapted to remove and pick up articles, and in the case of poultry processing, remove internal organs quickly and easily, and which is light in weight and may be easily manipulated.

Briefly stated, the invention in one form thereof, adapted to remove poultry lungs, comprises a tubular member disposed in a carrying handle and connectable to a vacuum source through a fluidically controlled valve. The handle further comprises a port through which air under pressure is directed and which when covered with the finger or other device will actuate a valve in the vacuum line to connect the tube to a vacuum source and render the vacuum apparatus operative to pick up or remove an article. The valve in the vacuum line is controlled by other valving means which normally renders the first valve closed but which is responsive to closing of the passage to open the valve in the vacuum line.

An object of this invention is to provide a new and improved fluid operated device.

Another object of this invention is to provide a new and improved vacuum device for picking up or removing articles which may be controlled merely by placing a finger over a pressure line.

A further object of this invention is to provide a device of the type described which is simple in operation, lightweight and utilizes only a small number of parts, and is relatively inexpensive.

Figure 2:
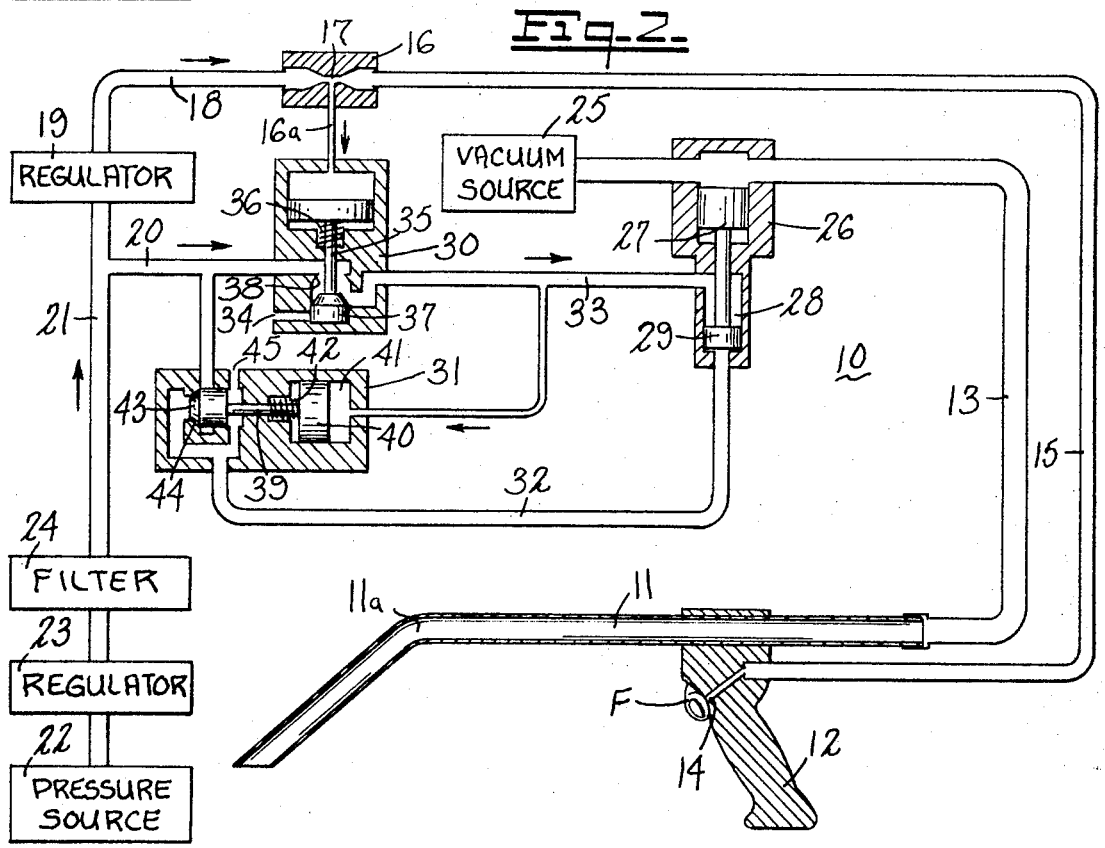

The features of the invention which are believed to be novel are particularly pointed out and distinctly claimed in the concluding portion of this specification. The invention, however, both as to its operation and organization, together with further objects and advantages thereof may best be appreciated by reference to the following detailed description taken in conjunction with the drawings, in which:

FIG. 1 is a diagram, partly schematic of a system embodying the invention in one mode of operation; and FIG. 2 is the same system of FIG. 1 but exemplifying a second mode of operation.

A system 10 embodying the invention generally comprises a tube-like member 11 carried in a support means in the form of a handle 12 and connected to a vacuum line 13 which is preferably flexible for movement of the handle 12 with tube 11. The tube 11 is angled at portion 11a thereof in a configuration which is normally referred to as a lung gun in the poultry processing industry. Tube 11 is preferably slidable in handle 12 to provide the desired length between the handle and the end of the tube. The handle has a port 14 therein communicating with the ambient atmosphere, and which is connected to a flexible pressure line 15 leading to a device 16 having a venturi-like constriction 17 defined therein. Connected to the other side of member 16 is a line 18 having a pressure regulator 19 therein behind a branch 20 with a line 21. At the end of line 21 is a pressure source 22 such as a compressor which supplies fluid under pressure to a pressure regulator 23 and a filter 24 to which is connected line 21. Regulator 19 preferably regulates the pressure in line 18 to a lower valve than that applied to branch 20.

So long as air may flow through lines 21, 18 and 15, and exit through port 14 there will be a pressure drop at the venturi 17. However, when port 14 is closed there will be no flow of air and therefore no pressure drop in venturi 17; i.e., the pressure is then static. The venturi 17 provides a means for sensing when port 14 is closed.

Line 13 connects tube 11 to a vacuum source 25 through a valve 26 which normally blocks communication between the source 25 and tube 11. Valve 26 includes a movable valving member 27 which is positioned in accordance with pressure applied to a cylinder 28 on either side of piston-like member 29.

Valve 26 is controlled by valving means in the form of a normally closed valve 30 and a normally open valve 31.

Normally opened valve 31 provides communication from branch 20 to line 32 and, hence, cylinder 28 to move valve member 27 upwardly and, hence, block communication between the vacuum source 25 and the tube 11.

Normally closed valve 30 blocks communication between branch 20 and a line 33 leading to the upper portion of cylinder 28. As shown, the line 33 is normally vented to atmosphere through a port 34 in valve 30. The valve 30 comprises a movable element 35 spring-biased towards the position shown in FIG. 1 by means of a spring 36 which moves the element 35 upwardly due to the reduced pressure in venturi 17. The upper chamber of valve 30 communicates with venturi 17 via line 16a. Movable element 35 further includes a lower valve member 37 and valve seat 38 adapted when opened to provide communication between branch 20 and line 33. Valve 31 comprises a movable valve element 39 with a piston-like portion 40 in cylinder 41. A spring 42 biases piston 40 and valve member 43 away from valve seat 44 to normally render valve 31 open and provides communication between branch 20 and line 32.

In the state shown in FIG. 1, there will be a relatively large pressure drop across element 16 so that there is not much pressure at the port 14 due to the flow of air in pressure lines 18 and 15 in the direction shown by the arrows. However, if port 14 should now be closed as by means of an operator's finger F, as shown in FIG. 2, there will be no flow of air through lines 18 and 15 and, hence, no pressure drop across the venturi 17. At this time, the pressure in the venturi 17 will rise to the value set by regulator 19 and the movable element 35 will move against the bias of spring 36 to the position shown in FIG. 2. This will cause valving member 37 to move from seat 38 and provide communication between branch 20 and line 33. Simultaneously, the pressure in line 33 will act against the piston 40 of valve 31, which piston 40 is of greater area than valve member 43 and member 39 will move to the position shown in FIG. 2. When valve member 43 is seated, cylinder 28 is vented through port 45 in valve 31 through line 32. These movements have a snap-acting effect and member 27 in valve 26 moves to the position shown in FIG. 2 to provide communication between the tube 11 and vacuum source 25.

At this time, the articles to be picked up or organs to be removed from the poultry are drawn up through tube 11 and line 13 for disposal.

When the port 14 is again opened as by removal of the finger F therefrom, a drop in pressure will again appear across venturi 17 and the valve element 35 will move upwardly to the position shown in FIG. 1, blocking communication between branch 20 and line 33. At the same time, the pressure in cylinder 28 is exhausted through line 33 and vent 34 in valve 30. The pressure in line 33 now becomes that of the ambient atmosphere and spring 42 will move valve member 39 back to the position shown in FIG. 1 to provide communication between branch 20 and line 32 and shift the position of member 27 of valve 26, thereby blocking communication between the vacuum source and tube 11.

The change of state of the valves 30 and 31 occurs very quickly and provides very rapid change of state of the condition of valve 26 to either create a suction at tube 11 or block communication with the vacuum source. The off-on function of the valves 30 and 31, while shown as two separate valves, could be incorporated in one four-way valve if this should be desirable.

The port 14 may be closed either by a finger F as exemplified in FIG. 2 or port 14 may be opened and closed through use of a solenoid-actuated valve or an electromagnetic switch. However, in the event that such a switch-controlled means is utilized, it is desired that only a small amount of finger pressure would be necessary to operate such valve to open or close port 14.

While the invention has been shown as applied to a vacuum utilization apparatus, it may also be utilized in conjunction with a device to apply air pressure. For example, in another application the vacuum source might be replaced with a source of pressure and the tube 11 replaced by an air motor utilized to operate an eviscerating tool.

It may thus be seen that the objects of the invention set forth as well as those made apparent from the foregoing description are efficiently attained. While various embodiments of the invention have been set forth for purposes of disclosure other embodiments of the invention as well as modifications to the disclosed embodiments thereof may occur to those skilled in the art. Accordingly, the appended claims are intended to cover all embodiments of the invention as well as modifications to the disclosed embodiment thereof which do not depart from the spirit and scope of the invention.

What is claimed is:

1. A device for controlling the application of fluid between a vacuum source and a nozzle, comprising a fluid line connecting the vacuum source and said nozzle, a valve in said line, said valve being normally closed but adapted to be opened to provide communication between said nozzle and the vacuum source, support means for said nozzle, a port in said support means, a second line connecting the port to a fluid pressure source whereby fluid under pressure is exhausted through said port when said port is open and a static pressure is established in said second line when said port is closed, and valving means connected to said fluid pressure source and responsive to static pressure in said second line to open said valve and connect said vacuum source to said nozzle.

2. The device of claim 1 wherein said valve comprises a valving member including a cylinder with a piston therein, and lines leading to said cylinder on opposite sides of said piston, said valving means controlling the application and exhaust of pressure to said cylinder.

3. The device of claim 2 wherein said valving means comprises a normally closed valve and a normally open valve, said normally open valve applying pressure to said cylinder to maintain said valve in a closed position.

4. The device of claim 1 wherein said second line includes a restriction therein adapted to produce a pressure drop thereacross, said second valving means being effective to maintain said valve in a closed position so long as a pressure drop occurs across said restriction.

5. The device of claim 4 wherein said second valving means is responsive to an increase in pressure at said restriction to open said valve.

6. A vacuum operated device for eviscerating poultry or the like having a nozzle and a support therefor, a first line connecting said nozzle to a vacuum source, a first fluid pressure responsive valve in said first line including an element arranged to block communication between the source and said nozzle and to provide communication therebetween, a port in said support, a second line connecting said port to a fluid pressure source so that fluid is exhausted through said port when said port is uncovered, said port adapted to be closed to establish a static pressure in said second line, a third line having a second valve therein connecting said first valve to the pressure source, said second valve being responsive to establishment of a static pressure in said second line to provide communication between the pressure source and said first valve to cause said first valve to provide communication between the vacuum source and said nozzle.

* * * * *